March 6, 1962
J. FISHER
3,023,991
MAGNETIC HANGER
Filed Jan. 29, 1959
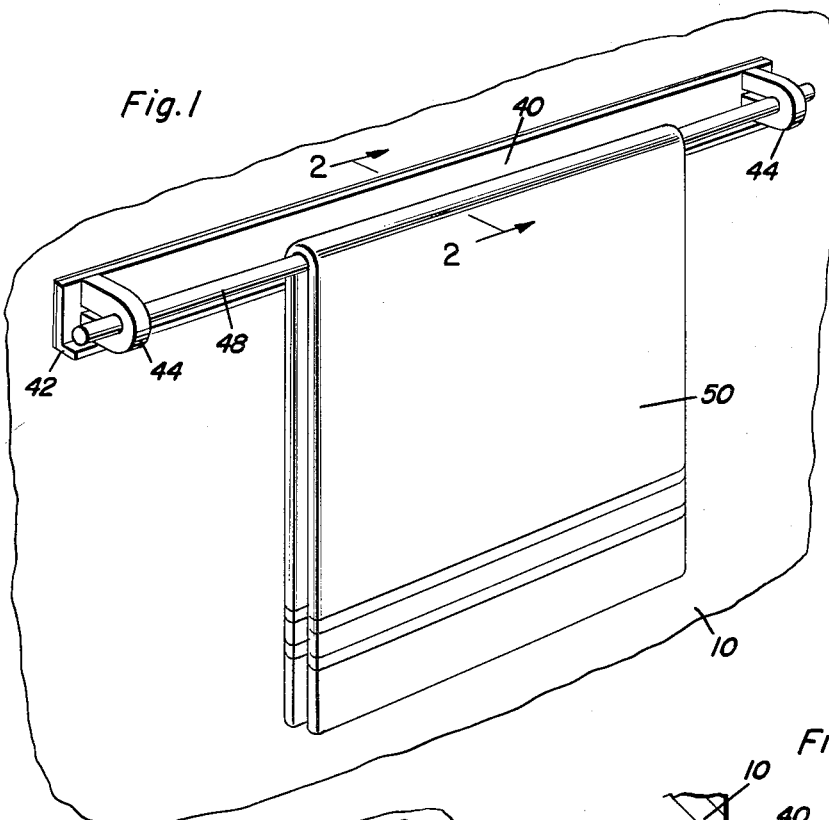
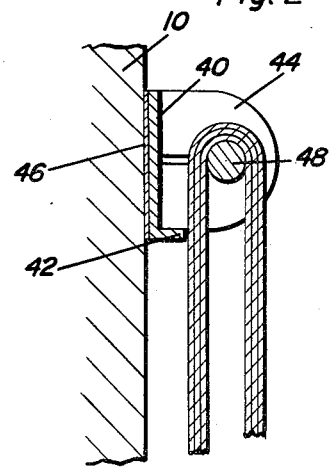
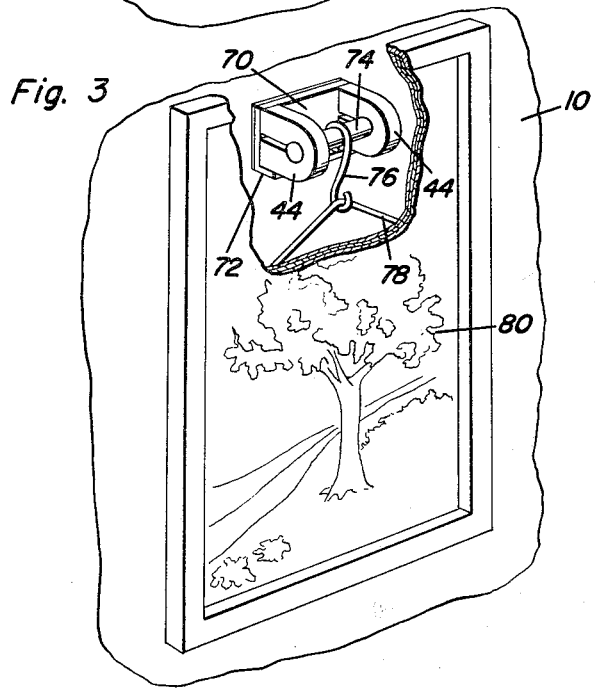
Janina Fisher
INVENTOR.
BY *Clarence A. O'Brien*
and *Harvey B. Jacobson*
Attorneys

United States Patent Office 3,023,991
Patented Mar. 6, 1962

3,023,991
MAGNETIC HANGER
Janina Fisher, 1154 Hedgewood Lane, Schenectady, N.Y.
Filed Jan. 29, 1959, Ser. No. 789,879
3 Claims. (Cl. 248—205)

This invention relates to hangers and more particularly to a magnetic hanger that has an adhesive surface by which to apply the hanger onto a supporting surface, for example a wall.

An object of the invention is to provide a pair of magnets connected by a supporting rod and being detachably mounted on a strip of L-shaped configuration and of thin, lightweight magnetic material which has a surface film of adhesive material, for example a pressure sensitive adhesive, so that the hanger strip may be applied onto a wall or some other surface without using tools or conventional fasteners such as nails or screws.

The adhesive used with the strip is conventional and commercially available. There is a variety of adhesives, some being pressure sensitive, although it is not essential that a pressure sensitive adhesive be used. A water soluble adhesive may be substituted with equal success.

Although magnetic hangers are well known, all previous magnetic hangers require that at least one of the parts of the magnetic hangers be fastened in place by means of a nail or nails or a screw or screws or some other type of fastener requiring penetration of the supporting wall. This hanger distinguishes from previous hangers by completely obviating the necessity of nails, screws or the like.

It is to be understood that many types of objects and devices may be supported by a hanger constructed in accordance with this invention. Some of these are shown in the drawings, although it is impossible to illustrate or even mention each and every article or device capable of being supported by the hanger.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a hanger constructed in accordance with the invention.

FIGURE 2 is an enlarged sectional view taken on the line 2—2 of FIGURE 1.

FIGURE 3 is a perspective view of a modification.

In the accompanying drawings there is shown a supporting surface 10 shown to diagrammatically represent any type of supporting surface. In most cases, the supporting surface will be a part of a wall, although it is to be understood that the principles of the invention are applicable in connection with any supporting surface capable of having one of the hangers fixed to it. To facilitate description, the supporting surface 10 shall be deemed a wall with a reservation that any operative supporting surface may be used.

FIGURES 1 and 2 illustrate one embodiment of the invention. The strip 40 is made of magnetizable material and includes a forwardly extending flange 42 at its lower edge. The flange may be made integral with the remainder of strip 40 and functions as a stop for magnets 44. The rear surface of strip 40 has a film 46 of adhesive substance adhered thereto. This film of adhesive is used for fastening the strip 40 on a supporting surface 10.

Magnets 44 are horse shoe magnets with the space between the sides of each magnet drilled out or otherwise made slightly enlarged to accommodate hanger rod 48. The hanger rod is slipped through the openings in the magnets 44 thereby suspending it. The hanger rod may then be used as a rack for towel 50, for wash clothes and for other purposes. The flange 42 constitutes an abutment against which magnets 44 bear to limit the downward movement of the magnets on strip 40. This is a safety factor to anticipate rough usage, for example a small child reaching up and pulling on both ends of towel 50. However, there are various mechanical ways of limiting the downward movements of the magnets 44; for example the method of direct fastening to the strip 40 by a twist block which need not be made of magnetic material.

FIGURE 3 illustrates another modification. Strip 70 is identical to strip 40 in all respects except the length thereof. It is considerably shorter and has two magnets 44 above flange 72, the magnets and flange being the same except possibly for size, as the corresponding magnets and flange in FIGURE 1. Bar 74 carried by magnets 44 is considerably shorter than bar 48, and it has an S-shaped hanger 76 thereon by which to retain the picture cord or wire 78 attached to the rear of picture 80. Therefore, the principles of the invention are applicable to hanging objects such as pictures, maps, charts, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hanger for a variety of objects, said hanger comprising a flat strip having a flat rear surface, a film of adhesive material on said flat rear surface and engageable with and attachable to a supporting surface to hold said strip suspended on the supporting surface, and means connected with said strip for supporting the objects, said means comprising a pair of spaced horse shoe magnets with openings between the sides thereof, said strip being of magnetizable material so that said magnets may adhere thereto, a bar supported in said openings, a flange protruding laterally from the front surface of said strip and constituting a stop against which said magnets abut to limit the downward movement of the magnets on said strip.

2. A magnetic hanger comprising in combination a flat strip of magnetizable metal having front and back surfaces and upper and lower edges, a coating of adhesive provided on the back surface of said strip whereby the same may be secured in a horizontal position on a vertical supporting surface, a pair of horseshoe magnets provided at longitudinally spaced points on said strip and having their poles in abutment with the front surface of the strip whereby the magnets are magnetically supported on the strip and project forwardly therefrom, the bight portions of said magnets being provided with a pair of coaxial apertures, and a hanger rod having its opposite end portions mounted in said apertures whereby the rod is supported in forwardly spaced parallel relation to the strip and rigidly connects said magnets together.

3. The device as defined in claim 2 together with a forwardly projecting flange provided at the lower edge of said strip and supportably engaging lower edges of said magnets.

References Cited in the file of this patent

UNITED STATES PATENTS

| | | |
|---|---|---|
| 2,005,035 | Houtman | June 18, 1935 |
| 2,081,095 | Mull | May 18, 1937 |
| 2,389,298 | Ellis | Nov. 20, 1945 |

FOREIGN PATENTS

| | | |
|---|---|---|
| 731,513 | Great Britain | June 8, 1955 |
| 790,026 | Great Britain | Jan. 29, 1958 |
| 923,236 | France | Feb. 17, 1947 |